(12) United States Patent
Garrec et al.

(10) Patent No.: US 12,270,459 B2
(45) Date of Patent: Apr. 8, 2025

(54) CABLE ACTUATOR WITH IMPROVED FORCE SENSITIVITY

(71) Applicant: COMMISSARIAT A L'ENERGIE ATOMIQUE ET AUXENERGIES ALTERNATIVES, Paris (FR)

(72) Inventors: Philippe Garrec, Gif sur Yvette (FR); Alexandre Verney, Les Echelles (FR)

(73) Assignee: COMMISSARIAT A L'ENERGIE ATOMIQUE ET AUXENERGIES ALTERNATIVES, Paris (FR)

( * ) Notice: Subject to any disclaimer, the term of this patent is extended or adjusted under 35 U.S.C. 154(b) by 51 days.

(21) Appl. No.: 18/074,240

(22) Filed: Dec. 2, 2022

(65) Prior Publication Data

US 2023/0175575 A1 Jun. 8, 2023

(30) Foreign Application Priority Data

Dec. 3, 2021 (FR) ..................................... 2112897

(51) Int. Cl.
*F16H 25/24* (2006.01)
*F16H 19/06* (2006.01)
*F16H 25/20* (2006.01)

(52) U.S. Cl.
CPC ..... *F16H 19/0622* (2013.01); *F16H 25/2015* (2013.01); *F16H 25/24* (2013.01); *F16H 2019/0686* (2013.01)

(58) Field of Classification Search
CPC ......... F16H 25/2015; F16H 2025/2096; F16H 25/24; F16H 19/0628; G01B 3/1003
See application file for complete search history.

(56) References Cited

U.S. PATENT DOCUMENTS 10,384,340 B2 * 8/2019 Garrec ....................... B25J 1/00

FOREIGN PATENT DOCUMENTS

FR 3089359 A1 * 6/2020 ......... F16H 19/0622
WO 2019/029976 A1 2/2019

OTHER PUBLICATIONS

French Search Report for 2112897 dated, Jun. 21, 2022.

* cited by examiner

*Primary Examiner* — Gregory Robert Weber
(74) *Attorney, Agent, or Firm* — Sughrue Mion, PLLC

(57) ABSTRACT

A cable actuator (100) having a frame (10); a screw (2) rotatably mounted on the frame (10) and extending along a first axis (Ox); a nut (4) cooperating with the screw (2); a mechanism (30) for estimating the angular movement of the nut (4) about the first axis (Lx) relative to the frame (10); and a distance sensor (30) secured to the frame (10) and having a winder (33) for winding a thread (32), one end (32.1) of the thread (32) connected to the nut (4) at a connection point (4.1). The distance sensor (30) is arranged in such a manner that the thread (32) changes curvature at a first point (34) situated in a first plane ($P_1$) orthogonal to the first axis (Ox).

9 Claims, 5 Drawing Sheets

CABLE ACTUATOR WITH IMPROVED FORCE SENSITIVITY

FIELD OF THE INVENTION

The invention relates to a cable actuator having a screw-and-nut assembly in which the nut is movable in translation and is coupled by a cable to an element that is to be moved and that is provided with a force sensor. The invention relates more particularly to cable actuators in which the cable performs an anti-rotation function for preventing the nut from turning relative to the screw.

BACKGROUND OF THE INVENTION

Cable actuators are known that comprise a screw mounted on a frame and a nut cooperating with the screw. The nut is associated with anti-rotation means, such that rotation of the screw relative to the nut causes the nut to be moved axially. One or more cables associated with the nut are connected to an outlet of the actuator, which may be rotary (when the cables are connected to pulleys), or linear (when the cables are connected directly to the load that is to be manipulated).

Force sensors for such actuators are generally mounted directly on the outlet of the actuator, and they are found to be bulky, expensive, and/or not very accurate. Also, since such force sensors are coupled directly to the segments of the articulated arm, they need to withstand the impacts and the vibration that come from the segments and the loads they support. In order to avoid being too fragile, they must therefore be over-sized, thereby increasing their volume and decreasing their sensitivity. Thus, although cable actuators present characteristics that are advantageous, in particular in terms of compactness, it is difficult and expensive to operate them with force control, which restricts their distribution.

OBJECT OF THE INVENTION

An object of the invention is to improve the accuracy and the manufacturing and/or maintenance costs of a cable actuator.

SUMMARY OF THE INVENTION

To this end, there is provided a cable actuator comprising:
a frame;
a screw rotatably mounted on the frame and extending along a first axis;
a nut cooperating with the screw;
a first cable coupled to the nut and functionally connected to an outlet of the actuator;
a second cable coupled to the nut and functionally connected to the outlet of the actuator; and
a motor arranged to drive the screw in rotation;
the first cable being arranged to exert forces that oppose the nut being driven in rotation by the screw so as to constitute anti-rotation means such that turning of the screw under drive from the motor causes the nut to move along the screw between a first extreme position and a second extreme position that define a stroke for the nut; and
the cable actuator also comprising:
means for estimating the angular movement of the nut about the first axis relative to the frame; and
means for estimating the force being applied to the outlet of the cable actuator as a function of the angular movement of the nut about the first axis;
wherein the means for estimating the angular movement of the nut comprise a distance sensor secured to the frame and using a thread to sense distance, one end of the thread being connected to the nut at a connection point. According to the invention, the distance sensor is arranged in such a manner that the thread changes curvature at a first point situated in a first plane orthogonal to the first axis, the plane being situated at a first distance from the first extreme point that lies in the range 30% to 70% of the stroke.

An actuator is thus obtained that is provided with a sensor that is simple and that measures the angular position of the nut accurately. The location of the first point improves the sensitivity of the sensor by reducing the maximum stroke of the sensor. The ratio of the working movement of the sensor divided by its total movement is representative of the signal-to-noise ratio of the sensor, and by means of the invention, this is improved.

Advantageously, the first distance lies in the range 40% to 60% of the stroke, and is preferably 50%.

Advantageously, the first point is situated at a nonzero second distance from a straight line that connects the first axis to the connection point.

Advantageously, the change of curvature of the thread is obtained by a drum of the winder.

It is possible to adapt the location of the sensor as a function of other design requirements when the change in the curvature of the thread is obtained by means of a thread deflector, which could possibly be a pulley.

Preferably, the distance sensor comprises a winder for winding thread on a drum, and the change of curvature of the thread is obtained by the drum of the winder. The thread may occupy a plurality of turns around a drum of the winder.

Alternatively, the distance sensor using a thread comprises a linear movement sensor.

Other characteristics and advantages of the invention appear on reading the following description of a particular and nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
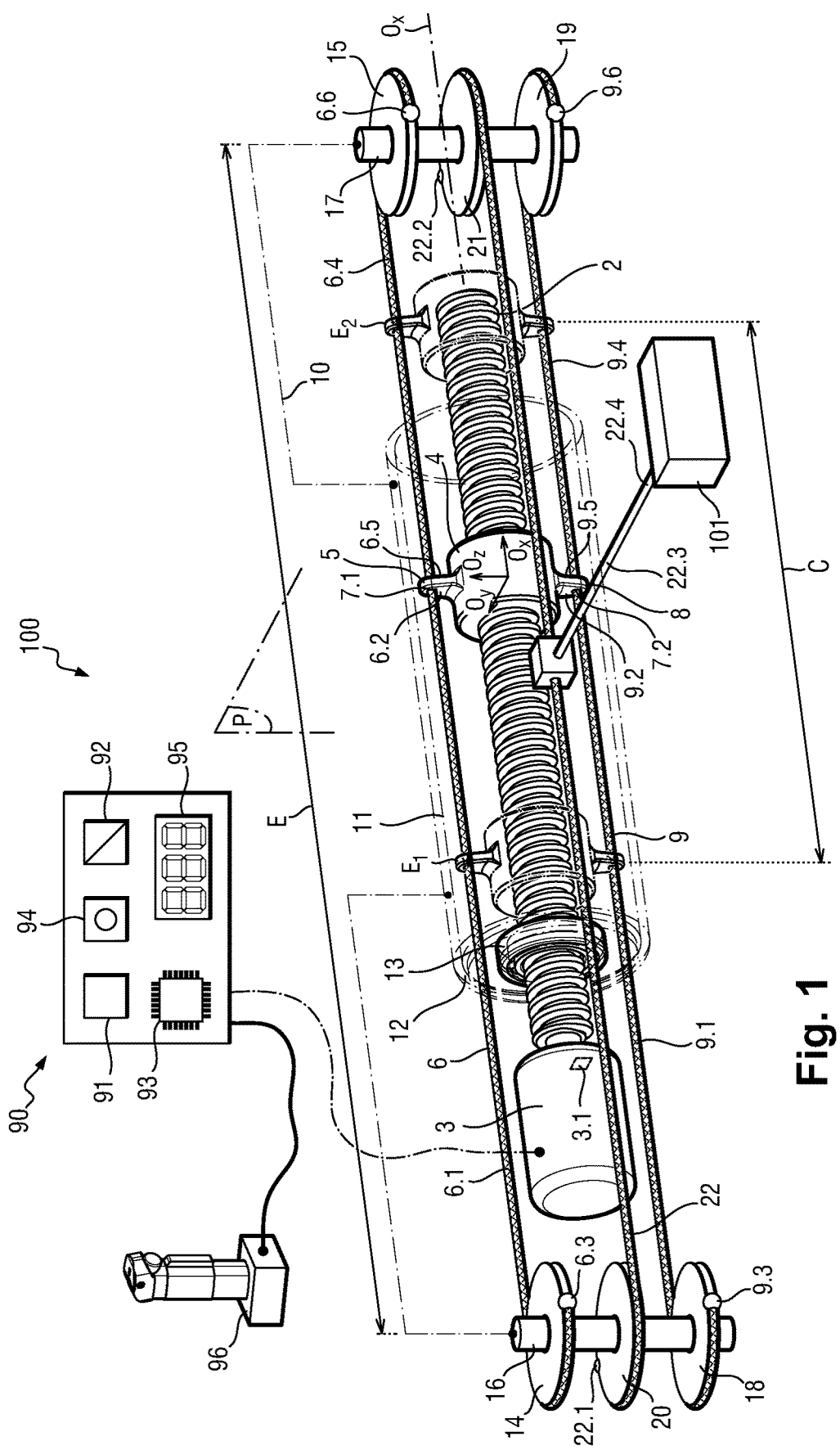
FIG. 1 is a diagrammatic view, partially in perspective, of a cable actuator.

With reference to FIG. 1, the actuator of the invention, given overall reference 100, comprises a frame 10, specifically a portion of a right cylinder 11 having a base 12 with a bearing 13 at its center receiving a screw 2 to rotate about a horizontal first axis Ox. The screw 2 is a ball screw of pitch $p_2$ that is driven in rotation by an electric motor 3 having a first rotary encoder 3.1. A nut 4 co-operates with the screw 2 and has a first eyelet 5 projecting radially from the nut 4. A first cable 6 extends parallel to the first axis Ox and includes a first segment 6.1 that is held at its first end 6.2 in the first eyelet 5 by a first crimp 7.1. The second end 6.3 of the first segment 6.1 of the first cable 6 is crimped to a first pulley 14 that is secured to a first shaft 16 rotatably mounted on the frame 10 to rotate about an axis perpendicular to the first axis Ox. The first cable 6 extends substantially parallel to the first axis Ox on both sides of a plane P that is orthogonal to the first axis Ox and that contains the first eyelet 5, and the first cable 6 has a second segment 6.4 that is held at its first end 6.5 in the first eyelet 5 by the first crimp 7.1. The second end 6.6 of the second segment 6.4 of the first cable 6 is crimped to a second pulley 15 that is secured to a second shaft 17 rotatably mounted on the frame 10 to rotate about an axis perpendicular to the first axis Ox.

The nut 4 has a second eyelet 8 projecting radially from the nut 4 so as to be diametrically opposite from the first eyelet 5. A second cable 9 extends parallel to the first axis Ox and includes a first segment 9.1 of the second cable 9 that is held at its first end 9.2 in the second eyelet 8 by a second crimp 7.2. The second end 9.3 of the first segment 9.1 of the second cable 9 is crimped to a third pulley 18 that is secured to the first shaft 16 that is rotatably mounted on the frame 10 to rotate about an axis perpendicular to the first axis Ox.

The second cable 9 likewise extends substantially parallel to the first axis Ox on both sides of the plane P that is orthogonal to the first axis Ox and that also contains the second eyelet 8, and the second cable 9 has a second segment 9.4 that is held at its first end 9.5 in the second eyelet 8 by the second crimp 7.2. The second end 9.6 of the second segment 9.4 of the second cable 9 is crimped to a fourth pulley 19 that is secured to the second shaft 17 that is rotatably mounted on the frame 10 to rotate about an axis perpendicular to the first axis Ox.

Each of the first and second cables 6 and 9 is pre-loaded to a pre-loading tension $t_{6,9}$ that is equal to half the total pre-loading $t_0$, e.g. by acting on the distance between the first and second shafts 16 and 17.

The actuator 100 also has a fifth pulley 20 and a sixth pulley 21 that are secured respectively to rotate with the first shaft 16 and with the second shaft 17. A third cable 22 extends between the fifth and sixth pulleys 20 and 21 and has a first end 22.1 crimped to the fifth pulley 20 and a second end 22.2 crimped to the sixth pulley 21.

A support 22.3 is crimped on the third cable 22 in order to constitute an outlet 22.4 of the actuator 100 that is for connecting to a load 101 that is to be moved.

The motor 3 and its encoder 3.1 are connected to a control unit 90 comprising a unit 91 for estimating the position of the nut 4, a comparator 92, calculation means 93, a memory 94, and a display 95. A control handle 96 is also connected to the control unit 90.

Since the first and second cables 6 and 9 are under tension, they exert forces that oppose the screw 2 turning the nut 4 while the motor 3 is rotating in order to move the nut 4 in either direction relative to the screw 2. Under such circumstances, in addition to performing their function of transmitting movement forces from the nut 4 to the load 101, the cables also perform an anti-rotation function such that the screw 2 rotating under drive from the motor 3 causes the nut 4 to move relative to the screw 2 between a first extreme position $E_1$ and a second extreme position $E_2$ for the nut 4, as shown by chain-dotted lines in FIG. 1. The first and second positions $E_1$ and $E_2$ are spaced apart by a stroke C. The cable actuator 100 of the invention enables the load 101 to be moved in two opposite directions.

Figure 2:
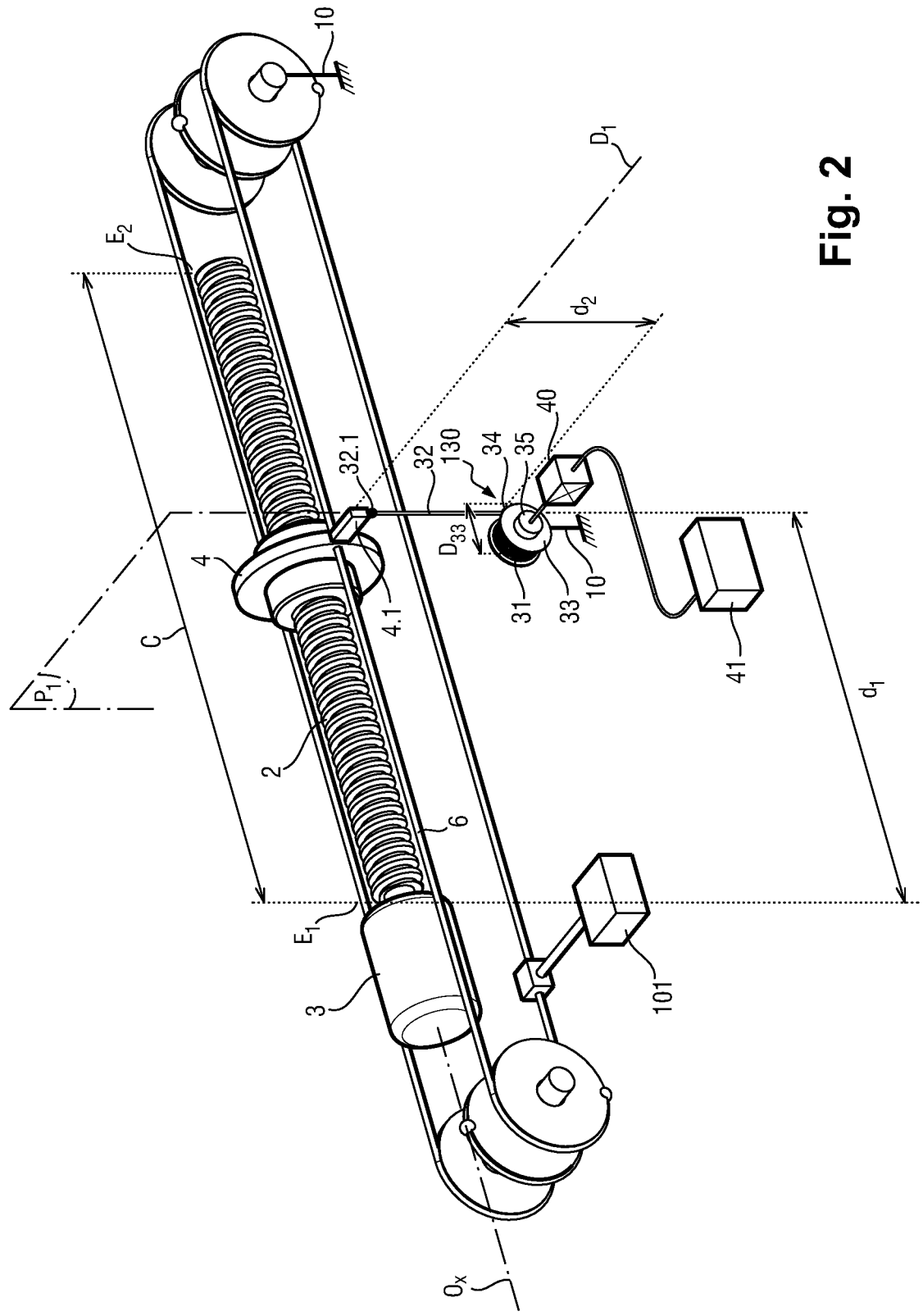
FIG. 2 is a diagrammatic view in perspective of a first embodiment of the invention.

In a first embodiment of the invention, as shown in FIG. 2, a distance sensor 30 having a winder 31 for winding a thread or filament 32 is secured to the frame 10. The thread or filament 32 could be a wire. The thread 32 has a first end 32.1 of the thread 32 connected to the nut 4 at a connection point 4.1. The thread 32 is engaged on a drum 33 of the winder 31 at a first point 34 (a point of tangency) and it occupies a plurality of turns around the drum 33. The drum 33 has a diameter $D_{33}$. A spiral spring 35 exerts a return force on the drum 33 and keeps the thread 32 permanently under tension. A rotary encoder 40 measures rotation of the drum 33. The rotary encoder 40 of the distance sensor 30 is connected to a processor unit 41, itself connected to the control unit 90. The curvature of the thread 32 changes at the first point 34 while the thread is being wound on the drum 33.

As can be seen in FIG. 2, when the nut 4 is at half-stroke, the point 34 is situated in a plane $P_1$ orthogonal to the first axis Ox and the plane $P_1$ is situated at a first distance $d_1$ from the first extreme point $E_1$. In this configuration, the distance $d_1$ is equal to 50% of the stroke C. Thus, in this example, the point 34 is situated in a midplane $P_1$ of the stroke C of the nut 4. The point 34 is also situated at a nonzero second distance $d_2$ from a straight line $D_1$ that connects the connection point 4.1 to the axis Ox.

In operation, a user acts on the handle 96 to cause the load 101 to move. The unit 90 then causes the motor 3 to rotate. Under drive from the motor 3, turning of the screw 2 causes the nut 4 to turn identically as a result of contact friction between the screw 2 and the nut 4. This turning tensions the first and second cables 6 and 9, which then exert forces opposing the nut 4 being driven in rotation by the screw 2. In addition to performing their function of transmitting movement forces to the load 101, the first and second cables 6 and 9 then also perform an anti-rotation function such that the screw 2 rotating under drive from the motor 3 causes the nut 4 to move relative to the screw 2.

When the load 101 reaches the position desired by the user, the user ceases to act on the control 96. During a first step, the unit 91 estimates a theoretical position for the nut 4 of the screw 2 based on the number $\underline{N}$ of revolutions performed by the motor as measured by the encoded 3.1. The unit 91 thus establishes a theoretical linear position for the nut 4 of the screw 2 along the first axis Ox, and also a theoretical angular position for the nut 4 about the first axis Ox. The theoretical linear position of the nut 4 along the screw 2 corresponds to the position along the first axis Ox that the nut 4 would occupy on the screw 2 after $\underline{N}$ revolutions while unloaded, i.e. for a load 101 of zero mass. The theoretical angular position of the nut 4 around the axis Ox corresponds to the position around the axis Ox that the nut 4 would occupy on the screw 2 after N revolutions while unloaded, i.e. for a load 101 of zero mass. This theoretical angular position can vary as a function of the theoretical linear position of the nut 4 along the screw 2. For convenience of description, it is assumed that the angular and linear positions are measured in a rectangular reference frame (Ox, Oy, Oz) associated with the nut 4.

The actual position of the nut 4 on the screw 2 is estimated by the number of revolutions of the drum 33 as measured by the rotary encoder 40. The processor unit 41 measures the rotation $\alpha$ of the rotary encoder 40 and transmits it to the control unit 90. The comparator 92 compares the actual angular position of the nut 4 about the axis Ox with the theoretical angular position of the nut about the axis Ox and, by subtraction, the comparator 92 obtains a value $\delta_{ang4}$ for the deviation of the angular position of the nut 4.

The calculation means 93 then estimate the force being applied to the support 22.3 by the load 101 as a function of the value $\delta_{ang4}$ of the deviation of the angular position of the nut 4.

This estimation may be performed in particular by solving the following equation 27 for nut equilibrium:

[Math 1]

$$C = \frac{2RE\rho^2 \sin\alpha}{(d-\overline{p}\alpha)(E-d+\overline{p}\alpha)} \times$$

$$\sqrt{2\rho^2(1-\cos\alpha)+(d-\overline{p}\alpha)^2} + $$
$$\sqrt{2\rho^2(1-\cos\alpha)+(E-d-\overline{p}\alpha)^2} - E + 2^{-1}(k_1^{-1}+k_2^{-1})t_0$$
$$k_1^{-1}\left(\frac{\rho^2\sin\alpha}{E-d+\overline{p}\alpha}+\overline{p}\right)\sqrt{\frac{2\rho^2(1-\cos\alpha)}{(d-\overline{p}\alpha)^2}+1} - $$
$$k_2^{-1}\left(\frac{\rho^2\sin\alpha}{d-\overline{p}\alpha}-\overline{p}\right)\sqrt{\frac{2\rho^2(1-\cos\alpha)}{(E-d+\overline{p}\alpha)^2}+1}$$

in which:

C corresponds to the torque applied to the first pulley 14;

R corresponds to the radius of the first pulley 14;

E corresponds to the distance between the points of tangency of the first cable 6 on the first pulley 14 and on the second pulley 15;

α corresponds to the angle of rotation of the nut 4 relative to the frame 10;

ρ corresponds to the anchor radius where the first cable 6 is anchored relative to the axis of the nut 4 (or of the screw);

d corresponds to the distance from the center of the nut 4 to the point of tangency of the first cable 6 on the first pulley 14;

$\overline{p}$ corresponds to the "reduced pitch" of the screw-and-nut system 2, 4 i.e. to $p_2/2\pi$;

$k_1$ corresponds to the stiffness of the shorter of the strands of the first cable 6 from among the strand between the nut 4 and the first pulley 14 and the strand between the nut 4 and the second pulley 15;

$k_2$ corresponds to the stiffness of the longer of the strands of the second cable 9 from among the strand between the nut 4 and the first pulley 14 and the strand between the nut 4 and the second pulley 15; and $t_0$ corresponds to the total pre-loading tension shared over the first and second cables 6 and 9.

The approximations leading to this equation or enabling it to be sold (e.g. limited developments) may depend on the linear position of the nut 4 of the screw 2.

A cable actuator 100 is thus obtained in which the sensor 30 serves to estimate the tensions in the first and second cables 6 and 9, thus making it possible to deduce the force being exerted on the outlet 22.4 of the actuator 100. The position of the point 34 of the drum 33 varies as a function of the position of the nut 4 of the screw 2. Thus, the position of the plane $P_1$, and thus the distance $d_1$, varies during movement of the nut 4 of the screw 2. To a first approximation, it is possible to estimate that the distance $d_1$ varies over an amplitude range that is substantially equal to half the diameter $D_{33}$.

In the description that follows of second, third, and fourth embodiments of the invention, elements that are identical or analogous to those described above are given the same reference numerals.

Figure 3:
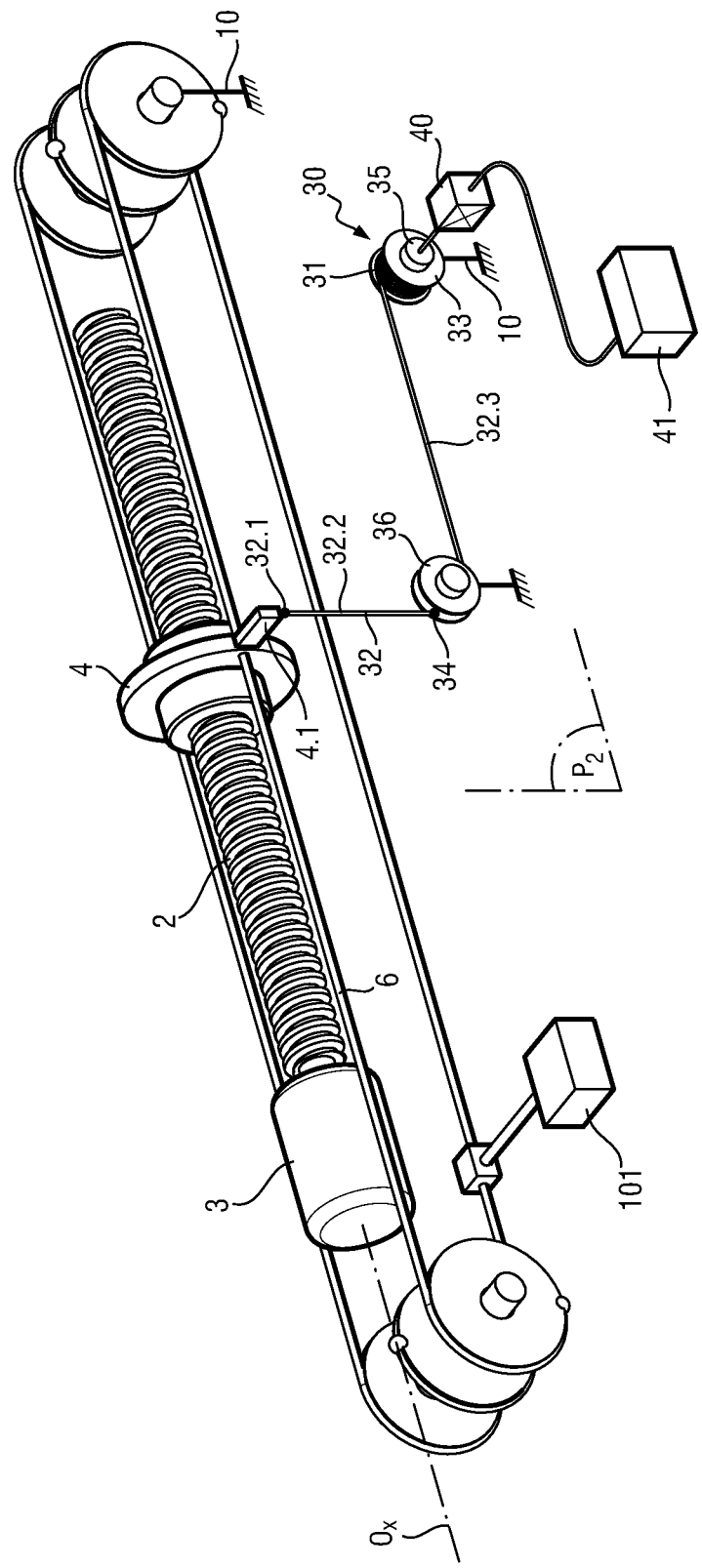
FIG. 3 is a diagrammatic view in perspective of a second embodiment of the invention.

In a second embodiment as shown in FIG. 3, the actuator 100 includes a thread deflector implemented in the form of a return pulley 36. The thread 32 extends from the connection point 4.1 to the pulley 36 that it engages at the point of tangency 34 of the thread 32 of the pulley 36. The thread 32 then changes curvature at the point 34. On leaving the pulley 36, the thread 32 extends to the drum 33, and in this example It does so along a direction that is substantially parallel to the axis Ox.

Figure 4:
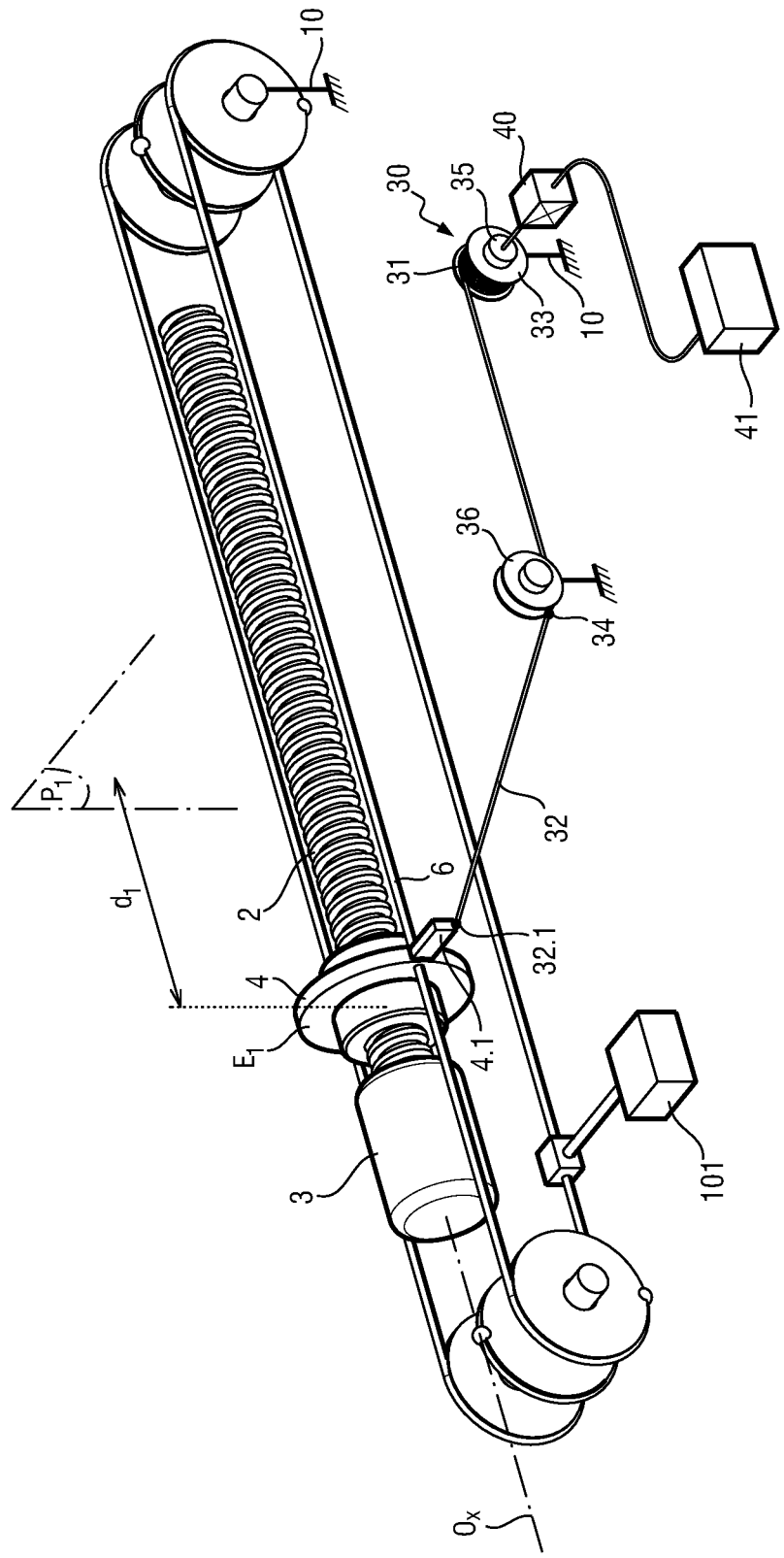
FIG. 4 is a diagrammatic view in perspective of the FIG. 3 embodiment in a first configuration.
Figure 5:
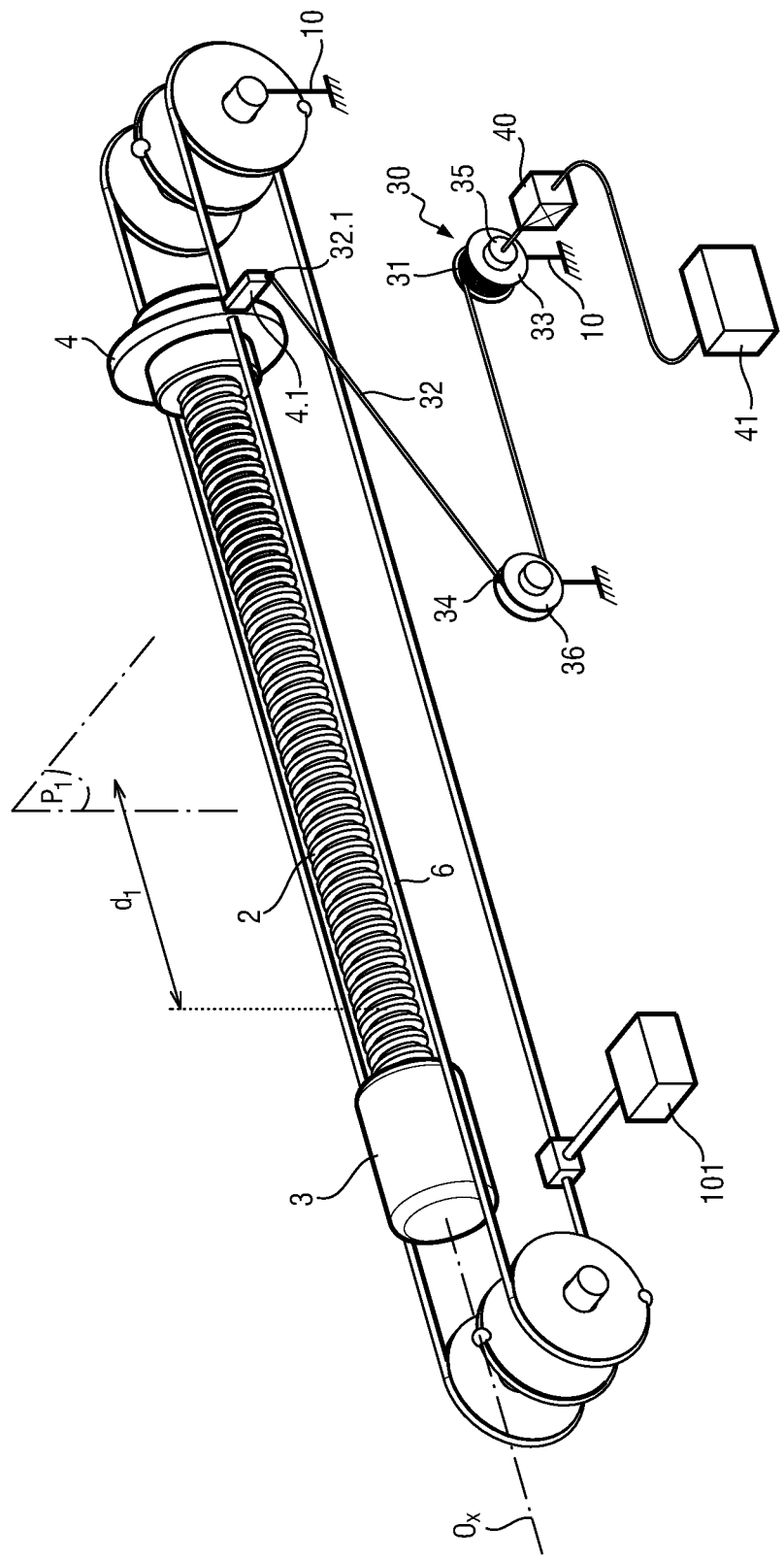
FIG. 5 is a diagrammatic view in perspective of the FIG. 3 embodiment in a second configuration.

As can be seen in FIGS. 4 and 5, the distance $d_1$ between the plane $P_1$ and the extreme position $E_1$ varies with the position of the nut 4 along the screw 2, while remaining in the range 40% (FIG. 4) to 60% (FIG. 5) of the stroke C.

Depending on the dimensions of the various components of the actuator 100, the thread 32 may have a first portion 32.2 extending between the points 32.1 and 34, and a second portion 32.3 extending between the point 31 and the pulley 36, which presents a deflection relative to a second plane $P_2$ for winding the thread 32 on the pulley 36. Under such circumstances, and by way of example, in a third embodiment the pulley 36 is mounted in a clevis that is mounted to pivot about a pivot axis that is orthogonal to the axis of rotation of the pulley 36 so that the plane $P_2$ always contains the portions 32.2 and 32.3 of the thread 32. In this third embodiment, the pivot axis needs to be parallel with and close to the portion 32.3, and ideally is concentric therewith. For example, if the pivot axis is mounted on ball bearings, even a very low level of tension in the thread 32 suffices to keep the pulley 36 automatically in the plane of the two portions 32.2 and 32.3.

In a fourth embodiment, the distance sensor 30 using the thread 32 may comprise a linear sensor with return that is connected to a second end of the thread 32.

Naturally, the invention is not limited to the embodiments described, but covers any variant coming within the ambit of the invention as defined by the claims.

In particular:

although above, the frame is cylindrical in shape, the invention applies equally well to frames of other shapes, e.g. such as a plate, a square tube, or any shape;

although above, the axis of rotation of the screw extends horizontally, the invention applies equally to other orientations for the axis of rotation of the screw, e.g. such as a vertical orientation, an orientation of 45°, or any orientation;

although above, the cable actuator has two cables connected to the nut, the invention applies equally to an actuator in which the nut is connected to a single cable or to more than two cables;

although above, the outlet of the cable actuator is connected to a cable in order to deliver movement in translation, the invention applies equally to an outlet that is constrained to rotate with one of the shafts of the actuator in order to deliver a movement in rotation;

although above, the user acts on a handle in order to control the actuator, the invention applies equally to other control means, e.g. such as a switch, or even by voice;

although above, estimation of the force exerted by the actuator is described for when the actuator is stabilized in a given position, the invention applies equally to measuring the force dynamically while the actuator is moving;

although above, the actuator includes a ball screw, the invention applies equally to other types of screw, such as for example a screw with threads only, or a roller screw;

although above, the first cable is coupled to the nut by crimping to an eyelet secured to the nut, the invention applies equally to other means for coupling a cable to the nut at a first connection point connecting the first cable to the nut, such as for example a ring welded on the nut, crimping in a hole made in the nut, round turns in a drill hole, fastening to an intermediate support;

although above, the cables extend parallel to the first axis, the invention applies equally to other configurations of the cables in which a cable can adopt any orientation relative to the first axis;

although above, the first and third pulleys are secured to the same shaft, the invention applies equally to pulleys mounted on independent shafts;

although above, all of the cables of the actuator are pre-loaded, the invention also applies to a single pre-loading cable, to no pre-loading cable, or to only a fraction of the cables being pre-loaded;

although above, the actuator includes a pulley for effecting the thread, the invention applies equally to the thread being defected in other ways, e.g. by a rotatably-mounted shaft, a metal or synthetic eyelet, a stationary shaft made of low-friction material of bronze or polytetrafluoroethylene (PTFE) type; and although above, the screw is mounted in a bearing, the invention applies equally to other means for rotatably mounting the screw on the frame, e.g. such as a bronze bushing, or a bearing having needles, balls, or conical rollers.

The invention claimed is:

1. A cable actuator (100) comprising:
a frame (10);
a screw (2) rotatably mounted on the frame (10) and extending along a first axis (Ox);
a nut (4) cooperating with the screw (2);
a first cable (6) coupled to the nut (4) and functionally connected to an outlet (16, 17, 22.4) of the actuator (100);
a second cable (9) coupled to the nut (4) and functionally connected to the outlet (22.4) of the actuator (100); and
a motor (3) arranged to drive the screw (2) in rotation;
the first cable (6) being arranged to exert forces that oppose the nut (4) being driven in rotation by the screw (2) so as to constitute anti-rotation means such that turning of the screw (2) under drive from the motor (3) causes the nut (4) to move along the screw (2) between a first extreme position ($E_1$) and a second extreme position ($E_2$) that define a stroke (C) for the nut (4); and
the cable actuator (100) also comprising:
means (30) for estimating the angular movement of the nut (4) about the first axis (Lx) relative to the frame (10); and
a control unit that estimates the force being applied to the outlet (22.4) of the cable actuator (100) as a function of the angular movement of the nut (4) about the first axis (Ox);
wherein the means (30) for estimating the angular movement of the nut (4) comprise a distance sensor (30) secured to the frame (10) and using a thread (32) to sense distance, one end (32.1) of the thread (32) being connected to the nut (4) at a connection point (4.1); and
wherein the distance sensor (30) is arranged in such a manner that the thread (32) changes curvature at a first point (34) situated in a first plane ($P_1$) orthogonal to the first axis (Ox), the first plane ($P_1$) being situated at a first distance ($d_1$) from the first extreme position ($E_1$) that lies in the range 30% to 70% of the stroke (C); and
wherein the thread has at least a portion extending between the first point and the end of the thread connected to the nut, said portion extending orthogonally or at an incline relative to the first axis.

2. A cable actuator (100) according to claim 1, wherein the first distance ($d_1$) lies in the range 40% to 60% of the stroke (C).

3. A cable actuator (100) according to claim 1, wherein the first point (34) is situated at a nonzero second distance ($d_2$) from a straight line ($D_1$) that connects the first axis (Ox) to the connection point (4.1).

4. A cable actuator (100) according to claim 1, wherein the change of curvature of the thread (32) is obtained by a deflector (36) for deflecting the thread (32).

5. A cable actuator (100) according to claim 4, wherein the deflector (36) for deflecting the thread (32) comprises a pulley (36).

6. A cable actuator (100) according to any claim 1, wherein the distance sensor (30) comprises a winder (31) for winding thread on a drum (33), and wherein the change of curvature of the thread (32) is obtained by the drum (33) of the winder (31).

7. A cable actuator (100) according to claim 6, wherein the thread (32) occupies a plurality of turns around the drum (33).

8. A cable actuator (100) according to claim 1, wherein the distance sensor (30) using a thread (32) comprises a linear movement sensor.

9. The cable actuator (100) according to claim 1, wherein the first distance ($d_1$) is 50% of the stroke.

* * * * *